United States Patent [19]
Maguire

[11] Patent Number: 4,606,572
[45] Date of Patent: Aug. 19, 1986

[54] AUTOMOBILE SUN SHADE AND METHOD OF MAKING SAME

[75] Inventor: Paul R. Maguire, Los Angeles, Calif.

[73] Assignee: Bonatrade International Inc., Santa Ana, Calif.

[21] Appl. No.: 752,977

[22] Filed: Jul. 8, 1985

[51] Int. Cl.⁴ ............................................... B60J 3/00
[52] U.S. Cl. ............................. 296/95 R; 296/95 C; 296/97 D; 296/97 E; 296/97 G; 160/134; 160/DIG. 3
[58] Field of Search ............... 296/95 C, 95 R, 96, 296/97 D, 97 E, 97 C, 97 G; 160/134, DIG. 3

[56] References Cited

U.S. PATENT DOCUMENTS 1,510,984 10/1924 Dorsey et al. ..................... 160/134
2,897,002 7/1959 Yovich ............................ 296/95 R
4,332,414 6/1982 Surtin .............................. 296/97 D

FOREIGN PATENT DOCUMENTS 565330 3/1958 Belgium .
815405 6/1959 United Kingdom .

Primary Examiner—Robert R. Song
Attorney, Agent, or Firm—Harold L. Jackson; Stanley R. Jones

[57] ABSTRACT

An automobile sun shade is described in which a plurality of elongated blades are pinned together at one end. The blades are provided with a plurality of openings intermediate the ends thereof. The joinder tape is woven through the openings in each blade to permit the blades to be opened in a fan-like manner in either direction or folded to occupy the space of a single blade.

10 Claims, 7 Drawing Figures

AUTOMOBILE SUN SHADE AND METHOD OF MAKING SAME

BACKGROUND OF THE INVENTION

1. Field of the Invention

The present invention relates to a sun shade for automobile windows, and more particularly to such a shade which can be opened in a fan-like manner or folded to occupy substantially the space of a single blade.

2. Brief Description of the Prior Art

Removable shades have been developed for insertion between the windshield of an automobile and the dash to reflect the sunlight and thereby prevent the temperature within the automobile from rising to unacceptable levels when the automobile is left in the sunlight. For example, two such shades are shown in U.S. Pat. No. 4,332,414 which issued to Robert Surtin on June 1, 1982 and United Kingdom Design Registration No. 941,197 which was registered Mar. 22, 1969 to Siu Tung-Chow of Hong Kong. These prior art shades employ a plurality of elongated slats with elongated openings disposed in the slats between a pinned end and a free end thereof. A joinder tape is inserted through the openings to secure the slats together so that they can be opened in a fan-like manner or folded. While such prior art shades are effective in shading the interior of an automobile, there is room for improvement. For example, the joinder tape in the shade of the '414 patent is arranged so that the shade can only be opened in one direction (i.e., clockwise per FIG. 1) and when the edge of the slat forming one of the openings comes into direct contact with the tape. The ability to open the shade in one direction only is limiting and the sharp edge will tend to cause the tape to fray, thereby shortening the life of the shade. These and other disadvantages of the prior art are overcome by the present invention.

SUMMARY OF THE INVENTION

In accordance with the present invention, a shade for automobile windows and the like is provided in which a plurality of substantially elongated blades or slats are pinned together at one end and arranged to be opened in a fan-like manner or folded to occupy substantially the space of a single blade. Each of the blades defines a slot centrally located with respect to the blade edges and intermediate the ends thereof. A pair of passageways are provided in each blade on each side of the central slot. A joinder ribbon is arranged to pass from a front face of each blade through the central slot therein to the rear face of the blade, then through the passageway nearest the central slot on one side to the front face, back through the passageway nearest the outer edge on said one side to the rear face, through the central slot to the front face, then through the passageway nearest the outer edge on the other side of the slot to the rear face, back through the passageway nearest the slot on said other side of the slot to the front face, back through the central slot to the rear face, and then on to the front face of the next adjacent blade.

As an alternative, the passageways on each side of the central slot may be arranged to provide one hook on each side of the slot. The joinder ribbon is threaded through the slot in each blade so that it forms a loop adjacent the front and rear face. Each loop is then placed over a separate hook to fasten the blades together. The advantages of the present invention will be apparent from the following description and accompanying drawings.

DETAILED DESCRIPTION OF THE DRAWINGS

Figure 1:
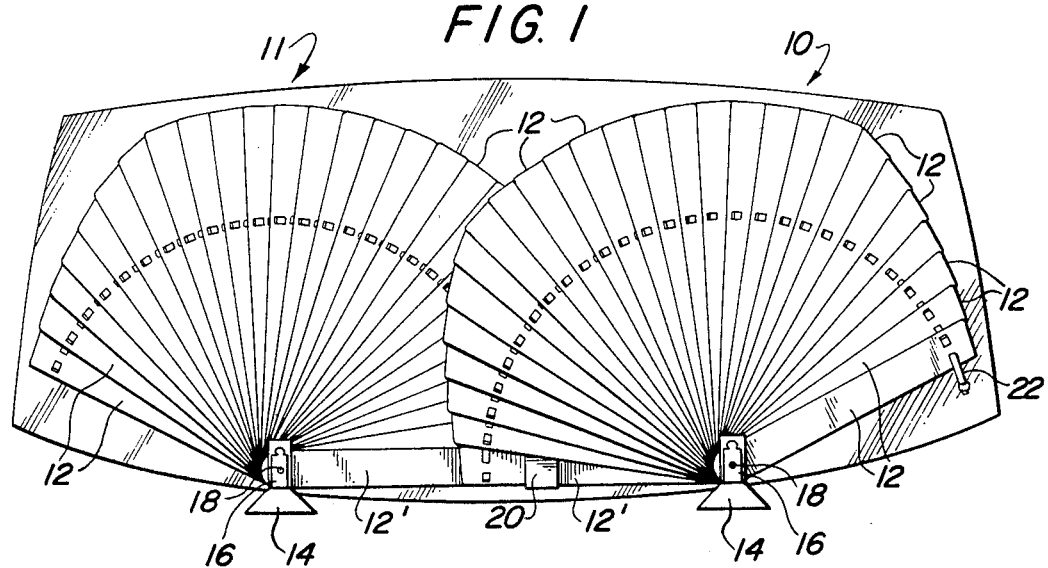
FIG. 1 is an elevational view of a pair of window shades in accordance with the present invention in which the two shades are joined together and overlap in the central portion of an automobile window.

Referring now to FIG. 1, there is illustrated a pair of sun shade devices 10 and 11, each of which comprises a plurality of elongated blades or slats 12 and a foot 14 which is arranged to sit on the dash of an automobile. The blades 12 for each shade are pinned together at one end 16 by a pin 18, which extends through the blades and the foot 14. Two adjacent blades 12' of the shades 10 and 11 are secured together by means of a movable sleeve 20 which slides over the blades 12' to hold the shades 10 and 11 in place on an automobile dash (not shown). Each of the blades is provided with a plurality of passageways through which a joinder tape 22 extends to secure the free ends of the blades 12 together.

Figure 2:
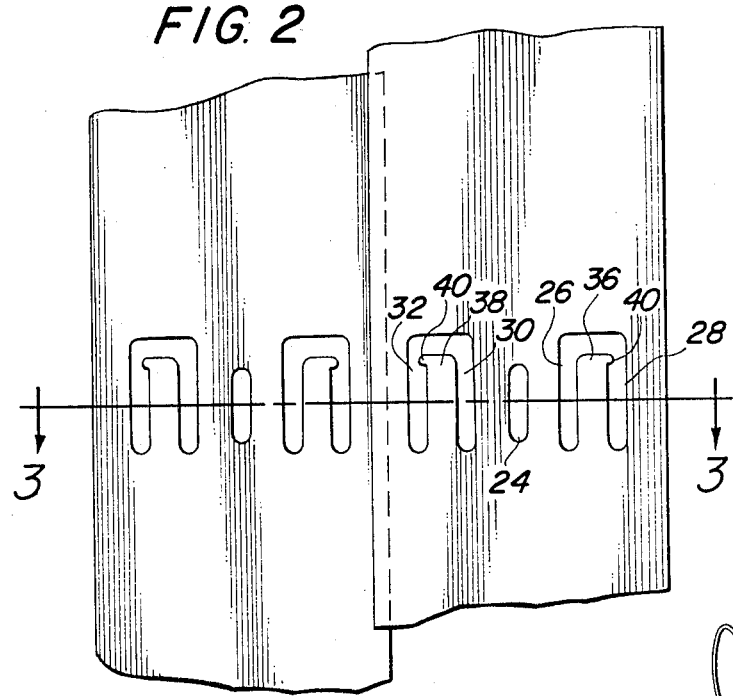
FIG. 2 is a fragmentary plan view of two of the blades used in the shade of FIG. 1.

Referring now to FIG. 2, the passageways in each blade member 12 adapted to receive the joinder tape 22 comprise a central slot 24, a first pair of passageways 26 and 28 extending on one side of the slot 24 and a second pair of passageways 30 and 32 on the other side of the slot. As is illustrated, the pair of passageways 26 and 28 form a hook 36 and passageways 30 and 32 form a hook 38. Each hook has a lip portion 40 at the top portion thereof which lip faces away from the slot 24 as shown.

Figure 4:
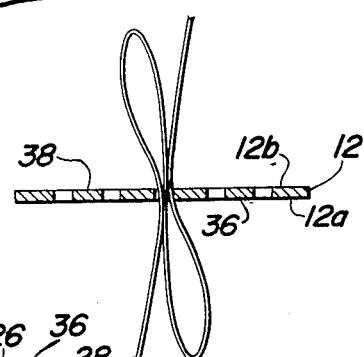
FIG. 4 is a sectional of one of the blades of FIG. 3 showing the manner in which the joinder ribbon can be extended to form two loops, one adjacent each face of the blade.

Referring now to FIG. 4, there is illustrated one method of inserting the tape through the blades 12 to secure the free ends thereof together so that the blades can be opened in a fan-like manner as is shown in FIG. 1 or folded to occupy substantially the space of a single blade. The tape is doubled back on itself, as is illustrated in FIG. 4, to form a loop adjacent the front face 12a of the blade 12 and another loop adjacent the rear face 12b of the blade 12. The loop extending adjacent the front face 12a is inserted over the hook 36, as is illustrated, for example, in FIG. 3, and the loop extending adjacent the rear face 12b is mounted over the hook 38. This process is continued until the tape is threaded through each of the passageways 24, 26, 28, 30 and 32 in each of the blades. The slack in the tape is then removed until the shade, when opened and the tape pulled taut, will provide only a slight overlap between adjacent blades, as is shown in FIG. 2.

Figure 3:
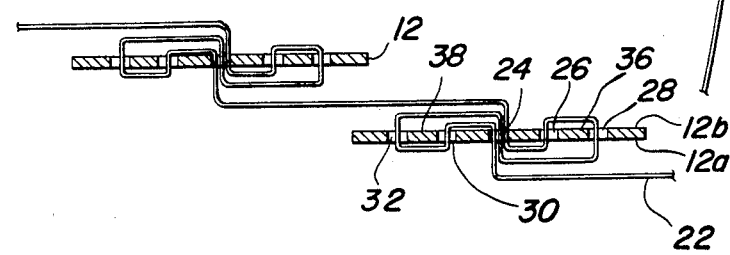
FIG. 3 is a sectional view taken along the lines 3—3 in FIG. 2.

As illustrated in FIG. 3, the joinder tape passes from the front face 12a of the blade through the central slot 24 to the rear face of the blade, then through passageway 30 nearest the central slot, back to the front face, through passageway 32 nearest the outer edge to the rear face, through the central slot 24 to the front face of the blade, then through the passageway 28 nearest the outer edge on the right side of the slot to the rear face, back through the passageway 26 near the central slot to the front face, and then back through the central slot 24 to the rear face and to the front face of the next adjacent blade 12. The length of tape between adjacent blades determines the most open position of the blade. The blades may be closed or opened in either direction. When opened in the clockwise direction the joinder tape passing between the blades is prevented from coming into direct contact with the edge of the blade forming the central slot 24 by two thicknesses of the ribbon, as is illustrated in FIG. 4. This tends to prevent abrasion of the ribbon and lengthen the life of the shade.

Figure 5:
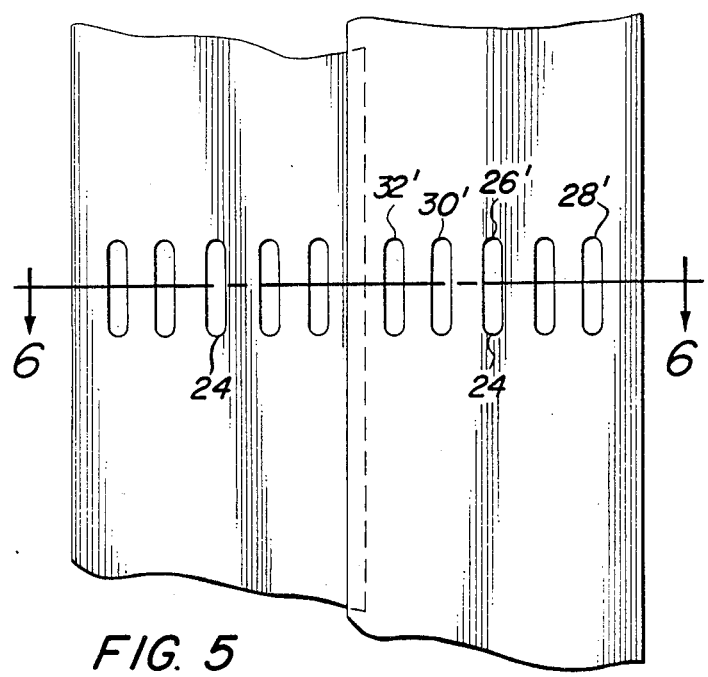
FIG. 5 is a fragmentary plan view of two of the blade members showing a different arrangement of passageways for receiving the joinder ribbon in accordance with another embodiment of the present invention.
Figure 6:
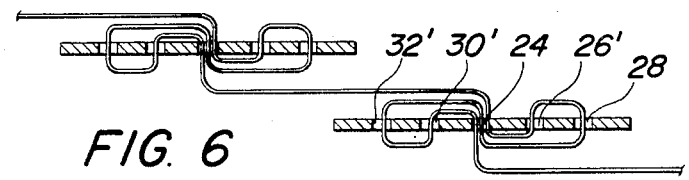
FIG. 6 is a sectional view taken along the lines 6—6 of FIG. 5.

Referring now to FIGS. 5 and 6, there is shown another embodiment of the present invention in which the passageways on either side of the central slot 24 are in the form of slots approximately the same size as the slot 24. These passageways are identified on the drawing by the numbers 26', 28', 30' and 32'. The tape is passed through these passageways in the same manner as was explained in connection with FIG. 3. In the embodiment of FIGS. 5 and 6, however, the tape cannot be looped and then inserted over hooks since the passageways 26', 28', 30' and 32' do not form hooks.

Figure 7:
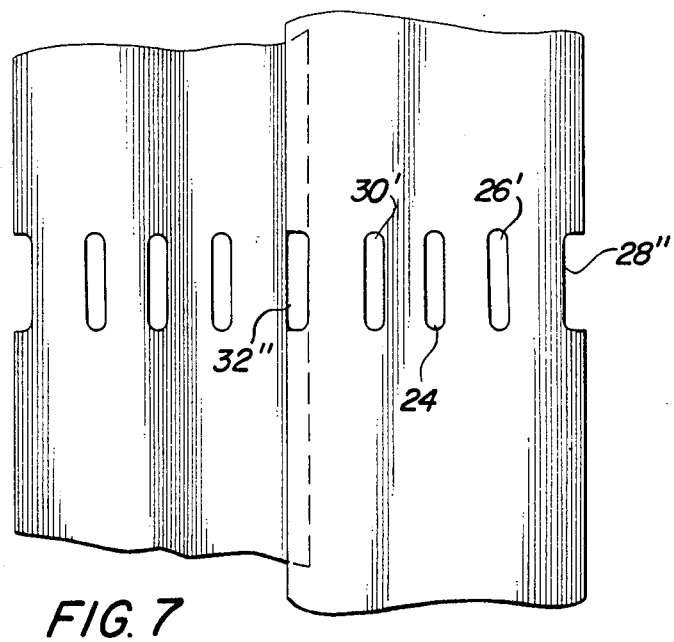
FIG. 7 is a fragmentary plan view of two of the blade members showing another arrangement of passageways for receiving the joinder tape in accordance with another embodiment of the present invention.

FIG. 7 illustrates another embodiment of the present invention in which the outer two passageways identified by the numerals 28' and 32' are simply cutouts in the edge of each blade. The tape is threaded through the blade shown in FIG. 7 in the same manner as is illustrated in connection with FIG. 6. The window shade is collapsible, and each of the shades 10 and 11 may be stacked individually. When it is desired to use the shade, the two shades 10 and 11 may be opened in a fan-like manner with the blades 12' fastened together by means of the sleeve 20. The combined shades may then be inserted on the dash of an automobile or other surface to reflect sunlight.

There has thus been described a novel automobile sunshade. It should be apparent that changes in modifications may be apparent to those skilled in the art without departing from the scope and spirit of the invention as it is defined in the appended claims.

What is claimed is:

1. In a shade for automobile windows and the like, the combination which comprises:
   (a) a plurality of substantially flat elongated blades pinned together at one end and being arranged to be opened in a fan-like manner or folded to occupy substantially the space of a single blade, each of the blades defining a slot centrally located with respect to the edges of the blade and intermediate the ends thereof and a pair of passageways on each side of the central slot; and
   (b) a joinder ribbon secured to the blades within the central slot and passageways, the ribbon passing from a front face of the blade through the central slot to the rear face of the blade, then through the passageway nearest the central slot on one side of the blade to the front face back through the passageway nearest the outer edge on said one side to the rear face of the blade, through the central slot to the front face of the blade, then through the passageway nearest the outer edge on the other side of the slot to the rear face back through the passageway nearest the central slot on said other side of the slot to the front face and then back through the central slot to the rear face and then on to the front face of the next adjacent blade.

2. The shade as defined in claim 1 wherein each of the passageways comprises a slot.

3. The shade as defined in claim 1 wherein the edges of the blades on either side of the slot define the passageway nearest the blade edges.

4. The shade as defined in claim 2 wherein passageways in the blade on each side of the central slot define a hook therebetween.

5. The shade as defined in claim 4 wherein the hook is rectangular in shape with a lip at the top thereof extending away from the central slot.

6. In a shade for automobile windows and the like, the combination which comprises:
   (a) a plurality of substantially flat elongated blades pinned together at one end and being arranged to be opened out in a fan-like manner or folded to occupy the space of a single blade, each of said blades being provided with a slot centrally located with respect to the edges of the blade and a hook on each side of the slot, the hooks and slot being located intermediate the pinned end and a free end; and
   (b) a joinder ribbon secured to the blades within the central slot and the hooks to permit the blades to open into a fan shape or fold, the ribbon passing from a front face of said blade through the central slot to the rear face of the blade around one of the hooks, back through the central opening to the front face, around the other hook, back through the central opening to the rear face, and then to the front face of the next adjacent blade.

7. The shade as defined in claim 6 wherein the central opening in each blade is slightly longer than the width of the ribbon and wherein each hook is formed by defining a U-shaped opening in the blade with the length of the opening being greater than the length of the central slot.

8. The shade as defined in claim 6 wherein the hook is rectangular in shape with a lip at the top thereof extending away from the central slot.

9. The method of manufacturing a shade for automobile windows and the like, compromising:
   (a) forming a plurality of substantially flat elongated blades having front and rear faces with a slot centrally located with respect to the edges of each blade and intermediate the ends thereof and a pair of passageways located on each side of the slot;
   (b) pinning the blades together at one end thereof to permit the blades to be opened in a fan shape or folded with the front face of open blade being positioned adjacent the rear face of the next blade; and
   (c) threading a joinder tape from the front face of each blade through the central slot to the rear face of the blade, through one passageway nearest the central slot on one side of the front face, through the other passageway on said one side to the rear face, then through the central slot to the front face, through the passageway nearest the outer edge on the other side of the slot to the rear face, through the other passageway on said other side of the slot to the front face and then back through the central opening to the rear face and on to the front face of the next adjacent blade so that adjacent blades are secured together by a section of the joinder tape passing through the central slot.

10. The method of manufacturing a shade for automobile windows and the like comprising:

(a) forming a plurality of substantially flat elongated opaque blades with a slot centrally located with respect to the edges of each blade and intermediate the ends thereof and a hook located on each side of the slot;

(b) pinning the blades together at one end;
(c) forming an elongated strip of joinder ribbon;
(d) threading the joinder ribbon through the slots in each blade with the ribbon folded into three thicknesses in each slot to form a loop on each side of the blade; and
(e) inserting each loop over a separate hook and adjusting the length of ribbon between adjacent blades so that the blades will open into a fan shape with the edges of adjacent blades in a slightly overlapping relationship or fold to occupy substantially the space of a single blade.

* * * * *

UNITED STATES PATENT AND TRADEMARK OFFICE
CERTIFICATE OF CORRECTION

PATENT NO. : 4,606,572
DATED : August 19, 1986
INVENTOR(S) : PAUL R. MAGUIRE

It is certified that error appears in the above—identified patent and that said Letters Patent is hereby corrected as shown below:

In Column 2, line 50, delete "a hook 36" and insert therefor --a hook 34--.

In Column 14 Claim 3, line 13, delete "blades" and insert therefor --blade--.

Claim 9, line 59, before "blade" delete "open" and insert therefor --one--.

Signed and Sealed this

Eleventh Day of February, 1992

Attest:

HARRY F. MANBECK, JR.

*Attesting Officer*     *Commissioner of Patents and Trademarks*